United States Patent [19]

Watanabe et al.

[11] Patent Number: 4,640,612

[45] Date of Patent: Feb. 3, 1987

[54] METHOD AND APPARATUS FOR CONTROLLING CONTINUOUSLY OPERATION OF AUTOMATIC PHOTO-COMPOSER

[75] Inventors: Yūki Watanabe; Hiroshi Tozaki, both of Tokyo, Japan

[73] Assignee: Hosen Printing Co., Ltd., Tokyo, Japan

[21] Appl. No.: 793,559

[22] Filed: Oct. 31, 1985

[30] Foreign Application Priority Data

Nov. 24, 1984 [JP] Japan .............................. 59-246991

[51] Int. Cl.⁴ .......................................... G03B 27/20
[52] U.S. Cl. ...................................... 355/87; 355/91; 355/95; 355/132
[58] Field of Search .................... 355/87, 91, 95, 125, 355/132

[56] References Cited

U.S. PATENT DOCUMENTS

| | | | |
|---|---|---|---|
| 2,210,726 | 8/1940 | Mazzocco | 355/87 |
| 3,052,174 | 9/1962 | Berger | 355/95 |
| 3,057,281 | 10/1962 | Pell | 355/87 |
| 3,472,591 | 10/1969 | Frohlich | 355/95 X |
| 3,503,679 | 3/1970 | Kawarabayashi et al. | 355/87 X |
| 3,544,213 | 12/1970 | Jaeger et al. | 355/95 X |
| 3,717,975 | 2/1973 | Bloom, Jr. | 355/95 X |
| 3,927,943 | 12/1975 | Pohl et al. | 355/91 X |
| 4,231,659 | 11/1980 | Logan | 355/132 |
| 4,325,632 | 4/1982 | Tsuji et al. | 355/95 X |

Primary Examiner—Richard A. Wintercorn
Attorney, Agent, or Firm—Rosen, Dainow & Jacobs

[57] ABSTRACT

The present invention relates to a continuous and automatic operation control method and apparatus for an automatic photo-composer, and is composed mainly of the steps of attaching a mark such as a bar code on a photographic original plate prior to the printing work by a photo-composer, setting up the predetermined amount of a photographic original plate and a photosensitive plate in a holder of the automatic photo-composer, reading the contents of the mark attached on each photographic original plate by a mark reader arranged in the photo-composer after starting to operate the photo-composer, and causing the automatic photo-composer to execute processes necessary for the photographic original plate in accordance with the computer program.

4 Claims, 11 Drawing Figures

PRIOR ART

METHOD AND APPARATUS FOR CONTROLLING CONTINUOUSLY OPERATION OF AUTOMATIC PHOTO-COMPOSER

BACKGROUND OF THE INVENTION

The present invention relates to a continuous and automatic operation control method and apparatus for a photo-composer to control a photo-composer for photomechanical process so as to be able to operate continuously and completely automatically.

A photo-composer comprises mainly a holder for setting the photographic original plates, a plate holder for setting the photosensitive plates, and a light source for printing the image of a photographic original plate on a photosensitive plate, and a photo-composer is a machine that multi-duplicatingly prints the image of a phtographic original plate on a photosensitive plate precisely by moving a holder for a photographic original plate with a feed mechanism right, left, up and down to the necessary amount against a plate holder respectively while appropriate distances therebetween, and by printing photographically the image at the predetermined position on the photosensitive plate repeatedly appropriate amount of light for each printing.

A press plate making process is situated between photographic original plate making process and printing process in a series of printing processes, and is a preparatory process for enabling the image of a imprimatured or OK'ed photographic original plate to be printed.

BRIEF DESCRIPTION OF THE DRAWINGS

For the purpose of illustrating the invention, there is shown in the accompanying drawing one form of which is presently preferred, it being understood that the invention is not intended to be limited to the precise arrangements shown therein.

Figure 1A:
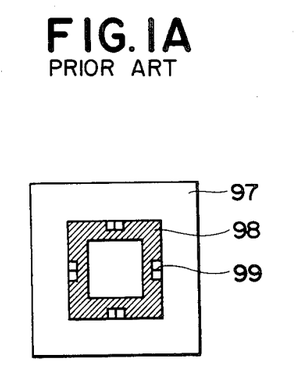
FIGS. 1A & B illustrates a light shielding mask in the prior art.
Figure 1B:
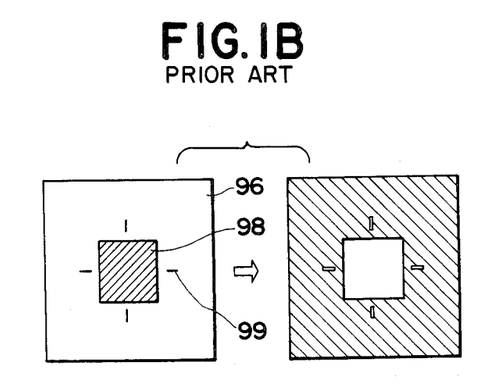
Figure 2A:
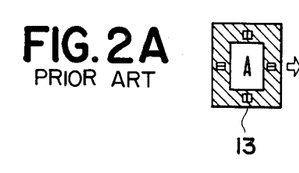
FIGS. 2A–D illustrates a mask for exposing the unnecessary area of the photo-sensitive plate.
Figure 2B:
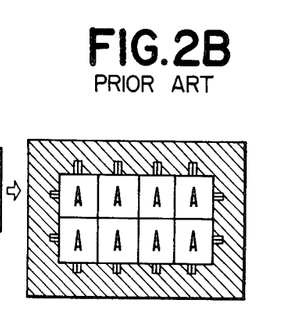
Figure 2C:
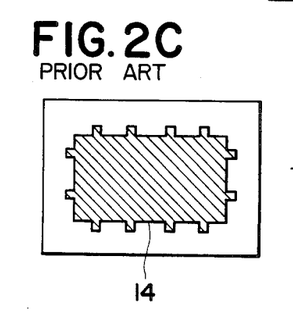
Figure 2D:
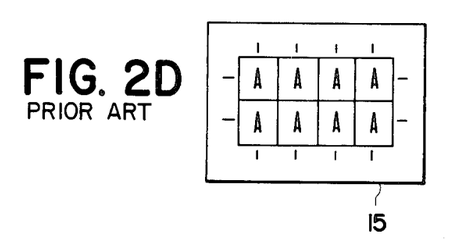

As preparation works prior to the printing by means of an automatic photo-composer (step and repeat machine), the steps of (1) checking a photo-composer mechanically, (2) forming a light shielding mask, (3) tabulating a feed length table, (4) forming a mask for exposing the unnecessary areas on the photosensitive plate, etc, are needed. Mechanical check includes oiling, inspection of oil gauge in a compressor, etc.. In case of the multi-duplicate printing, the light shielding mask covers the outside area of the process size on the photo-sensitive plate and shields light incident thereupon to thereby prevent said area from being exposed, so as to print the necessary images and register marks only. A light shielding mask may be made, for example, by positioning center register marks 99 on a semitransparent base film 97 and then marking the process size by a ball-point pen or the like and affixing a light shielding tape 98 around the process size, as shown in FIG. 1(A), thus shielding the exposure of light upon the outside area of the process size. A light shielding mask is formed according to the process size for each photographic original plate. As shown in the left side of FIG. 1(B), a light shielding mask may also be formed by determining the process size, locating the center register marks 99, determining the light shielding section 98, then writing the register marks and finally reversing the above result in a lith type film by a printer, as shown in the right side of FIG. 1(B). Taking the gripper margin of the plate into the consideration, the feed length table is made on the basis of the layout measure by tabulating the feed lengthes in both vertical and horizontal directions in a vertical type photo-composer, or in front and rear and right and left directions in a horizontal type photo-composer. A mask for exposing the unnecessary area on the photosensitive plate is used to expose the unexposed area around the image or picture when the positive type photosensitive plate such as the presensitized (PS) plate and the like is printed. An image of the photographic original plate 13 in FIG. 2(A) is composed of a photo-composer, for example, to the images which are eight-duplicate printed, as shown in FIG. 2(B). A complete press plate 15 which has the necessary images and register marks shown in FIG. 2(D) can be obtained by covering the photo-composed images by a mask 14 as shown in FIG. 2(C), exposing the uncovered area of the photosensitive plate and then uncovering a mask 14.

Figure 3:
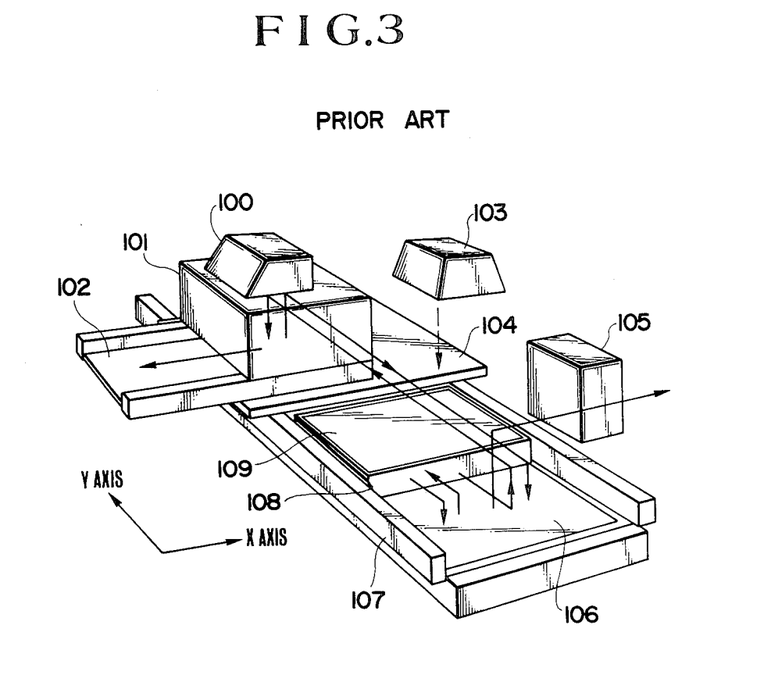
FIG. 3 is a perspective view showing an outline of the prior art automatic photo-composer.

FIG. 3 is a perspective view illustrating an outline of an automatic photo-composer in the prior art. In the photo-composer, the programs concerning the size and kind of the photographic original plate, size of the film, number of the duplicate printing, layout measure, and printing or photo-composing should be compiled in advance. As mentioned above, the photographic original plate, light shielding mask, mask for exposing the unnecessary areas of the photosensitive plate and photosensitive plate should also be prepared according to the programmed sequence. Commands and data necessary for printing or photo-composing are input into an automatic photo-composer by an input device such as a keyboard. In order to confirm the contents of the program or the printing data, they can be printed out by the printer or displayed on the character display if necessary. Thereafter, feed, vacuum contact, printing or photocomposing, and delivery, are executed sequentially and automatically in accordance with the input program in an automatic photo-composer. In detail, after pushing a start button to start a photo-composer, a photosensitive plate is carried to and set on a fitting plate for a photosensitive plate with an automatic carrier apparatus 105. A photographic original plate only in case of printing, or a photo-graphic original plate equipped with the aforementioned light shielding mask in case of photo-composing is fed from a pallet 102 for the photographic original plate to the position below a platform 101 for the photographic original plate, contacted to the photosensitive plate by a vacuum pump, and is delivered after being printed or photo-composed. In case of one time printing, a photosensitive plate which has been photo-composed is carried to a printing frame section 106. However, only in case of a multiduplicating printing, an exposure mask 109 for exposing the unnecessary areas of a photosensitive plate is carried and set up, and then contacted by the vacuum pump to a photosensitive plate, and finally exposed to a light source 103 for both one time printing and exposure of the unnecessary areas of a photosensitive plate. A large size photographic original plate can also be printed one time with the light source 103 by setting up an unexposed photosensitive plate onto a printing frame section 106. After completing printing work or photo-composing work, an exposure mask 109 is delivered or kept in the custody. Then, a photosensitive plate which has been multi-duplicatingly printed is carried into an automatic press plate process apparatus. Thereafter, a photosensitive plate is developed automatically to eliminate a photosensitive layer in the non-imaged section, erased, cleaned and dried to thereby complete a press plate. This press plate is fitted to a rotary press machine, and then, in case of colour printing, multicolour and multi-duplicate printing is executed using the press plate for each colour, black, red, blue and yellow.

As mentioned above in the prior automatic photo-composer, it is necessary to prepare a light shielding mask prior to the printing works, by coinciding the register marks of the photographic original film for each photographic original plate and forming the cover by the light shielding red film according to the process size. In case of multiduplicate printing, layout measure, distance between duplicate printing areas, gripper margin and the like should be considered. In spite of the fact that the formation of this light shielding mask is a fundamental technique of the plate making process, it has been depending upon the hand work in the prior art. That is to say, this light shielding mask is ordinarily made in a manner such that, by looking through the magnifying glass (loupe), the skilled worker cuts out precisely a light shielding red film for each photographic original plate according to the process size, then registers the light shielding film to the photographic original plate within the error range in micro-order, for example, within 70 micron, by matching three register marks, and then pastes the light shielding mask to the photographic original plate. The light shielding mask is also formed by a substantially similar manner by other methods. Accordingly, the prior art has a disadvantage that the light shielding mask costs much time and labor so as to make the light shielding expensive since the mask is required in the same number as that of the photographic original plate. Further, such prior art also has another disadvantage that the work is inefficient and that the accuracy varies widely since the skilled techniques of the hand work are needed in forming the light shielding mask. In the colour printing, discrepancy in location causes the colour shear phenomenon in printing.

In the prior art automatic photo-composer, it is necessary to compile and input manually the program which operates an automatic photo-composer according to the parameters such as the size and kind of the photographic original plate, size of the press plate, number of duplicate printing, exposure time and the like. Accordingly, the stacking sequence of the photographic original plates piled up in the photographic original plate stacker must be stacked in advance corresponding to the sequences in the aforementioned program and therefore the prior art has a disadvantage such that once the sequence of the original plates disagrees with that of the program, all the photographic original plates in such stacker are damaged. In case of the colour printing, the prior art also has a disadvantage such that the same program should be input four times for black, red, blue and yellow, according to the printing order for each colour since the press plate is processed for each colour of black, red, blue, and yellow by different photographic original plates and the multiple printing is performed sequentially in the order of the colour. Accordingly, in case of the colour printing, the programs and data for each colour should be confirmed one by one by the soft copy on the display etc. or the hard copy of the printer, etc..

SUMMARY OF THE INVENTION

Accordingly, it is an object of the present invention to provide a method and apparatus for controlling the operation of an automatic photo-composer continuously and automatically, which can eliminate the necessity of making the light shielding mask for each photographic original plate by hand work prior to the photomechanical process, and can also eliminate the necessities of writing the computer program for operating the photo-composer for each photographic original plate, of inputting data according to the sequence and of stacking the photographic original plates, and therefore can control the photo-composer to be operated continuously and completely automatically, with good accuracy of process and high improvement in operation efficiency in contract to the prior art.

A method of controlling the operation of an automatic photo-composer continuously and automatically of the present invention is composed of the steps of, firstly attaching to each photographic original plate a mark which indicates the necessary process command to be performed, for example, size of photographic original plate, number of duplicate printing, exposure time, layout measure and the like for the photographic original in the photo-composer, then setting up the predetermined amount of the photographic original plates and the photosensitive plates in the photo-composer, starting the operation of the photo-composer, reading a mark on the photographic original plate by the mark reader arranged in the photo-composer, transmitting the process commands necessary for each photographic original plate to a computer or CPU, and executing automatically a series of optimum processes necessary for photomechanical process by each section of the apparatus of the present invention in accordance with the control instructions in the program input and stored in the computer or CPU.

A continuous and automatic operation control apparatus for a photo-composer of the present invention is composed of a mark such as a bar code to be attached to the photographic original plate, a mark reader arranged in the photo-composer for reading the process command indicated on the mark, an abnormality display section for displaying abnormality occurred during automatic operation, a position display section for displaying the positions of photosensitive plate, light shielding mask and printing frame, an operating section for indicating the process for each sction of this control apparatus,a first control section for controlling the positions of photosensitive plate and printing frame, a second control section for controlling the operations of vacuum pump, light source and conveyor,a mask position control section for controlling the positions of the printing frame and the light shielding mask at the time of exposure of the unnecessary area of the photosensitive plate, a photo meter for setting up vacuum time and exposure time, a power supply section for supplying the supply voltages to the above mentioned sections, and a computer CPU for interpreting the contents of process in said mark under the control of program to feed the instructions to the said first control section, said second control section, said mask position control section and said photometer.

DESCRIPTION OF THE PREFERRED EMBODIMENT

Figure 4:
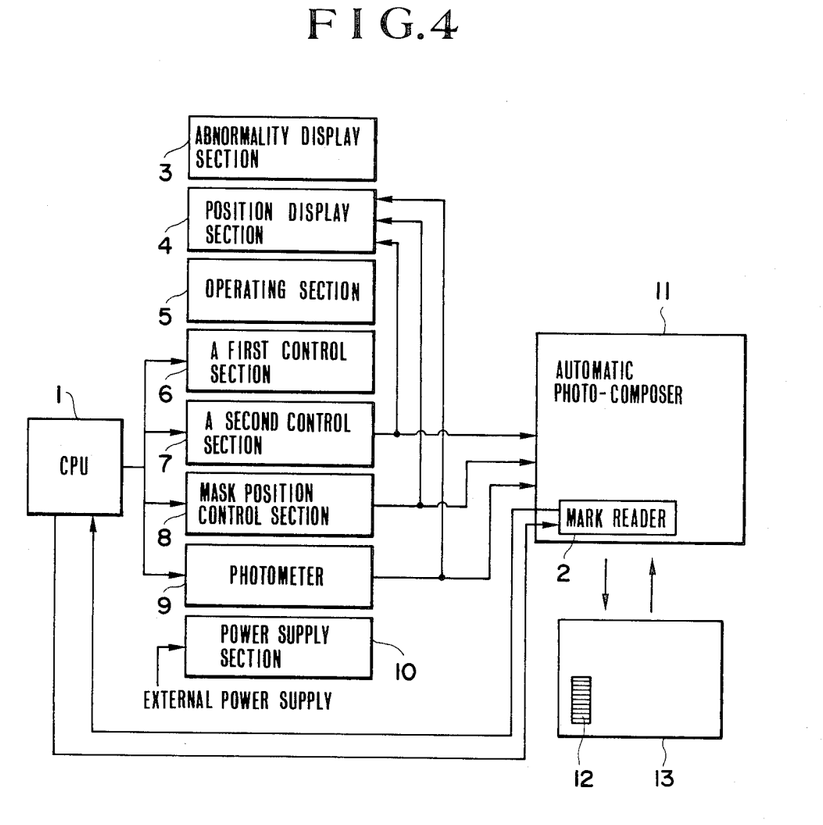
FIG. 4 is a block diagram illustrating an embodiment of a continuous and automatic operation control apparatus for a photo-composer of the present invention.

FIG. 4 is a block diagram illustrating an embodiment of a continuous and automatic operation control apparatus for a photo-composer of the present invention. This embodiment is composed of a mark 12 such as a bar code attached to a photographic original plate 13, a mark reader 2 for reading the contents of the mark according to a read command from CPU1 and for feeding a command necessary for the process of a photographic original plate to CPU1, an abnormality display section 3 for displaying at the maximum 30 types of the details of abnormality when such abnormality occurs during automatic operation, a position display section 4 for displaying the positions of the photosensitive plate such as the presensitized plate and the printing frame and for displaying the set up positions of upper, lower, right and left light shielding films, an operating section 5 for indicating start or stop operation and automatic or manual operation of the photo-composer, CPU operation or stop and operation of a compressor, and for energizing a buzzer when abnormality occurs, a first control section 6 for controlling the movements of the photosensitive plate and the printing frame, a second control section 7 for controlling the operations of light source lamp, automatic conveyor apparatus and vacuum pump which draws the photosensitive plate to the printing frame, a mask position control section 8 for controlling the positions of four, i.e., upper, lower, right and left light shielding films to thereby form a light shielding mask according to the process size of the photographic original plate, a photometer 9 for determining the amount of exposure for the photographic original plate, a power supply section 10 for supplying the supply voltages to the above mentioned sections from the external power supply, a CPU or microcomputer 1 for giving the instructions to first control section 6, second control section 7, mask position control section 8 and photo meter 9 in order to execute the necessary processes corresponding to information included in the mark 12.

Now, the mark 12 which is affixed to the photographic original plate 13 will be explained. Ordinarily, the mark 12 is a bar code or the like which is affixed to the edge portion of the photographic original plate or film 13, indicating the processes necessary for the photographic original plate in the photo-composer. CPU1 (or CPU 1) stores in advance the program indicating the contents of the mark 12 which is read by the mark reader 2, and then sends the read instructions to the mark reader 2. The contents included in the mark 12 are ten kinds, that is, size of the photosensitive plate such as the presensitized (PS) plate, sizes in X and Y axis directions of the photographic original plate, number of duplicate printing indicating any of one, two, four, eight, sixteen, and thirty two duplicate, distance between the duplicate printing areas, gripper margin for fixing the photosensitive plate, exposure time which is determined by selecting one of channels 0 through 9 that have different exposure time respectively, amount of movement for each light shielding film to form the light shielding mask, presence of the designation of the double printing, presence of the designation of the duplicate printing in case there is a designation for duplicate printing area in multi-duplicate printing, and presence of the designation of exposing the unnecessary area on the photosensitive plate.

In the present invention, the light shielding mask is formed by the four light shielding films which are moved by four step motors respectively between upper, lower, right and left edges and center point of the printing frame in accordance with the command from the light shielding film control apparatus in order to determine automatically the position and the size of the light shielding mask corresponding to the process size necessary for each photographic original plate. This light shielding mask has been invented by the same inventors as the present invention. Each light shielding film composing this light shielding mask also functions to form a mask for exposing the unnecessary areas on the photosensitive plate simultaneously.

Figure 5:
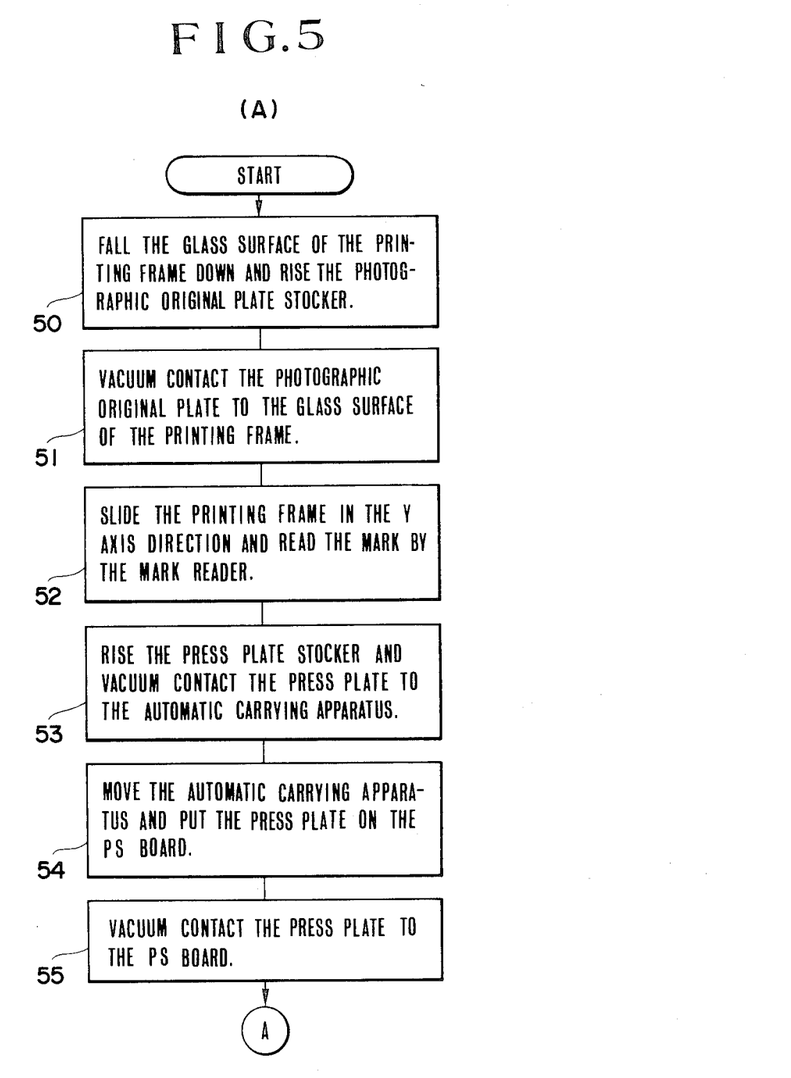
FIGS. 5(A) through 5(C) are, when taken together, flowcharts illustrating the essential steps of a method of continuous and automatic operation control of the present invention.

Next, referring to a flow chart shown in FIGS. 5(A) through 5(C), a continuous and automatic operation control method for the photo-composer of the present invention will be explained. For the convenience of the explanation, the explanation will be made, referring partially to the photo-composer explained in FIG. 3.

At first, when a start button for automatic operation on the operation section 5 of a continuous and automatic operation control apparatus is pushed, a photographic original plate stacker rises and a glass plate on an upper limit position within the printing frame 106 falls simultaneously (step 50). At the time a photographic original plate contacts the glass surface in the printing frame 106, a vacuum pump (not shown) starts to vacuum contact a photographic original plate to a glass surface in the printing frame 106 (step 51). The printing frame 106 slides in the Y axis direction in FIG. 3 and then CPU1 causes the mark reader 2 to read the mark 12 on the photographic original plate (step 52). A photosensitive plate stacker arranged under the printing frame 106 in FIG. 3 rises and an automatic conveyor apparatus 105 descends and then the vacuum pump starts to contact the photosensitive plate to the automatic conveyor apparatus 105 (step 53). In the present invention, the automatic conveyor apparatus 105 only moves up and down directly over the photosensitive plate stacker. Then, when the PS board which carrys the photosensitive plate over the photosensitive plate install table 107 slides to the position just under an automatic conveyor apparatus 105, the guide pins projects from the PS board and then an automatic conveyer apparatus 105 descends. The guide pins of the PS board are inserted into the holes of the photosensitive plate, and vacuum between the automatic conveyor apparatus 105 and the photosensitive plate is released, and then the photosensitive plate is put on the PS board (step 54). Thereafter, the automatic conveyer apparatus 105 immediuately rises. A vacuum pump starts to make vacuous the inside of the PS board and then the photosensitive plate is vacuum contacted to the PS board (step 55). Then, the guide pins of the PS board descend beneath the surface of the PS board.

Hereafter, in accordance with the contents of the mark 12 which are read by the mark reader 2, CPU1 causes each section of this control apparatus to operate in order to execute the process necessary for the photographic original plate. The first control section 6 moves to the predetermind position on the X axis the PS board which is carrying the photosensitive plate according to the instructions from CPU1 (step 56). The first control section 6 also moves the printing frame 106 to the predetermined position according to the instructions from CPU1 (step 57). The mask position control section 8 determines the positions of four, i.e., upper, lower, right and left light shielding films to the printing frame 106 so as to form the light shielding mask necessary for the photographic original plate and also the mask for exposing the unnecessary areas on the photosensitive plate, if necessary, according to the instructions from CPU1 (step 58). Next, the printing frame 106 descends on the photosensitive plate and stays thereon, and then the space between the printing frame 106 and the photosensitive plate is drawn by vacuum to contact the photographic original plate to the photosensitive plate (step 59). Now, the photometer 9 causes the photographic original plate to be exposed during the predetermined time according to the instructions from CPU1 and thereupon printing is executed (step 60). The exposure can be changed by the 0 through 9 channels in the photometer 9 according to the instructions from CPU1 and accordingly the exposure time can be changed. Having finished exposure, the vacuum between the printing frame 106 and the photosensitive plate is released and then the printing frame 106 rises (step 61).

In case of the multi-duplicate printing, each light shielding film moves in order to form the same light shielding mask in process size corresponding to the layout measure which is instructed by CPU1. Namely, the decision step 62 determines whether the designated number of duplicate printing is completed and, if it is not completed, the routine returns to the step 57. The printing frame 106 and the PS board also move to the next printing position and correspondingly the four light shielding films move to the new positions in the printing frame 106 to form the same light shielding mask in process size and the necessary mask for exposing the unnecessary areas on the photosensitive plate. Then, the printing frame 106 descends to fix the photosensitive plate, and the space between the photosensitive plate and the photographic original plate is made vacuum. Now, the exposure over the next duplicate printing area is made during the predetermined period of time and thereupon the duplicate printing is executed. After completing the exposure, the air is blown into the space between the photosensitive plate and the photographic original plate to separate them and then the printing frame 106 rises. These procedures are executed repeatedly corresponding to the number of duplicate printing. During this period of time, the printing frame 106 and the photographic original plate are held in the condition of vacuum contact.

After the predetermined duplicate printings are completed, the PS board moves to the position directly below the automatic carrier apparatus 105 and stays there. The printing frame 106 also moves to the position above the photographic original plate stacker and thereafter stays there. The vacuum in the PS board is then released. The automatic carrier apparatus 105 descends to vacuum contact the photosensitive plate. The automatic carrier apparatus 105 then moves to the right side direction and then descends to put the photosensitive plate on the carrying conveyor belt apparatus (not shown) arranged adjacent to the photo-composer in FIG. 3 (step 63). Hereafter, the processed photosensitive plate is carried into the automatic developing apparatus by the carrying belt apparatus and is then developed therein (step 64), and further erasure, cleaning and drying processes follow this developing process (step 65, 66). In the present invention, the receipt box for the photographic original plate moves to the position directly below the printing frame 106 and stays there and then the vacuum in the printing frame 106 is released and the air is blown into the space between the printing frame and the photographic original plate drops into the receipt box for the photographic original plate. Thereafter, the receipt box for the photographic original plate returns to its normal position and the photosensitive plate carrying belt apparatus stops its operation.

After this, next photographic original plate is fed by rising the photographic original plate stacker and is vacuum contacted to the glass plate of the printing frame 106, then the printing or photo-composing of the photographic original plate is executed continuously and completely automatically by the same procedures as the above mentioned and thus the press plate can be completed.

According to the continuous and automatic operation control method and apparatus for the photo-composer of the present invention, the following merits or advantages can be obtained. There is no necessity for making the light shielding mask for each photographic original plate by hand work prior to the printing work since the light shielding mask should be formed by the light shielding films which are automatically computer-controlled according to the contents of the mark attached to each photographic original plate. Also, there is no necessity for inputting data in advance in accordance with the pile up sequence of the photographic original plates in the photographic original plate stacker by hand work since the computer or CPU determines and executes automatically the processes necessary for the photographic original plate according to the contents in the mark attached to each photographic original plate. Accordingly even in case of the colour printing, there is no trouble for inputting the same program for each colour and there is no necessity for confirming the correspondence between the stacking sequence and the input data one by one outputting on the display or the printer. There is no necessity for forming the mask for exposing the unnecessary areas on the photosensitive plate by hand work before the printing process since the mask for exposing the unnecessary area on the photosensitive plate is also formed automatically by computer-controlled light shielding films simultaneously with forming the light shielding mask.

The invention being best described, it will be obvious that the same may be varied in many ways. Such variations are not to be regarded as a departure from the spirit and scope of the invention and all such modification as would be obvious to one skilled in the art are intended to be included in the scope of the following claims.

What is claimed is:

1. A method of controlling the operation of an automatic photo-composer continuously and automatically, the steps comprising:

attaching a mark which indicates necessary processes to be executed to a photographic original plate in said photo-composer, reading the contents of said mark by a mark reader provided in said photo-composer to thereby discriminate the contents of process necessary for said photographic original plate, moving a photosensitive plate to a predetermined position, moving a printing frame to which said photographic original plate is contacted to a predetermined position, controlling the positions of four, that is, upper, lower, right and left light shielding films provided in said printing frame to automatically form a light shielding mask necessary for said photographic original plate, printing said photosensitive plate by a predetermined amount of exposure, controlling the positions of said light shielding films to form a mask for exposing the unnecessary area on said photosensitive plate simultaneously with said light shielding mask as occasion demands, and exposing the unnecessary area on said photosensitive plate, and moving said light shielding mask and said printing frame to the predetermined positions to print repeatedly in response to the number of duplicate printing in case of the multiduplicate printing.

2. A method as claimed in claim 1, wherein said contents of said mark are size of said photographic original plate, size of said press plate, number of duplicate printing, distance between duplicate printing areas, gripper margin, exposure time, amount of movement of light shielding mask, presence of double printing designation, and presence of printing designation and exposure of the unnecessary area of said photosensitive plate.

3. A method as claimed in claim 1, wherein said mark is a bar code.

4. An apparatus for controlling the operation of an automatic photo-composer continuously and automatically, said apparatus comprising:

a mark to be attached to a photographic original plate for displaying the contents of process for said photographic original plate, a mark reader provided in said photo-composer for reading said mark when said photographic original plate is moved, an abnormality display section for displaying abnormality occurred during automatic operation and the contents of said abnormality, a position display section for displaying positions of a printing frame to which said photographic original plate is being contacted, a light shielding mask and a photosensitive plate, an operating section for indicating processes which are necessary for said photo-composer, a first control section for controlling the positions of said printing frame to which said photographic original plate is being contacted and said photosensitive plate, a second control section for controlling the operations of a vacuum pump, light source and carrying conveyer in said photo-composer, a mask position control section for controlling positions of four light shielding films for said printing frame at the time of printing and/or exposing the unnecessary area on said photo-sensitive plate, a photometer for setting up vacuum contact time and exposure time, a power supply section for supplying supply voltages to each section of said apparatus, and a CPU for controlling operations of said first control section, said second control section, said mask position control section and said photometer in accordance with the contents of process included in said mark under the control of the program which is input in advance.

* * * * *

UNITED STATES PATENT AND TRADEMARK OFFICE
CERTIFICATE OF CORRECTION

PATENT NO. : 4,640,612
DATED : February 3, 1987
INVENTOR(S) : Yuki Watanabe et al.

It is certified that error appears in the above-identified patent and that said Letters Patent is hereby corrected as shown below:

On the title page, item 73, after "Hosen Printing Co., Ltd., Tokyo, Japan" add --and Kamo Denki Research Institute Ltd,. Tokyo, Japan--.

Column 1, line 22, after "while" insert --maintaining--.

Signed and Sealed this

Twenty-fourth Day of November, 1987

*Attest:*

DONALD J. QUIGG

*Attesting Officer*  *Commissioner of Patents and Trademarks*